United States Patent
Sigg et al.

(10) Patent No.: US 8,347,807 B2
(45) Date of Patent: Jan. 8, 2013

(54) DASHBOARD INDICATOR MODULE

(75) Inventors: Daniel Sigg, Sonceboz (CH); Corinne Zuppigger-Lachat, Bienne (CH)

(73) Assignee: Sonceboz SA, Sonceboz (CH)

( * ) Notice: Subject to any disclaimer, the term of this patent is extended or adjusted under 35 U.S.C. 154(b) by 1003 days.

(21) Appl. No.: 12/301,706

(22) PCT Filed: May 23, 2007

(86) PCT No.: PCT/IB2007/001376
§ 371 (c)(1),
(2), (4) Date: Jan. 26, 2009

(87) PCT Pub. No.: WO2007/138437
PCT Pub. Date: Dec. 6, 2007

(65) Prior Publication Data
US 2009/0173271 A1 Jul. 9, 2009

(30) Foreign Application Priority Data
May 24, 2006 (FR) ...................................... 06 04705

(51) Int. Cl.
*G01D 11/28* (2006.01)

(52) U.S. Cl. ........................... 116/288; 116/286; 362/29

(58) Field of Classification Search ............... 362/26–30, 362/85, 511, 489, 555; 116/286–288, 305, 116/334, DIG. 36
See application file for complete search history.

(56) References Cited

U.S. PATENT DOCUMENTS

| | | | | |
|---|---|---|---|---|
| 5,603,283 A * | 2/1997 | Owen | ........................... | 116/284 |
| 5,706,757 A | 1/1998 | Hashimoto et al. | | |
| 6,408,784 B1 * | 6/2002 | Ross | ............................ | 116/288 |
| 6,470,822 B2 * | 10/2002 | Adams et al. | ................. | 116/284 |
| 6,598,988 B1 * | 7/2003 | Noll et al. | ........................ | 362/26 |
| 6,640,743 B2 * | 11/2003 | Nakane | ........................ | 116/286 |
| 6,854,416 B2 * | 2/2005 | Breinich et al. | .............. | 116/202 |
| 6,981,464 B2 * | 1/2006 | Birman et al. | ................ | 116/288 |
| 7,503,278 B2 * | 3/2009 | Sigg et al. | ..................... | 116/284 |
| 7,520,242 B2 * | 4/2009 | Vuilliomenet et al. | ........ | 116/288 |
| 7,721,672 B2 * | 5/2010 | Nakano et al. | ................ | 116/288 |
| 2002/0002941 A1 | 1/2002 | Nakane | | |
| 2004/0089219 A1 | 5/2004 | Burau et al. | | |
| 2007/0035960 A1 * | 2/2007 | Birman et al. | ................ | 362/489 |
| 2009/0038535 A1 * | 2/2009 | Morales et al. | ............... | 116/288 |
| 2010/0064962 A1 * | 3/2010 | Birman et al. | ................ | 116/288 |

FOREIGN PATENT DOCUMENTS

| | | |
|---|---|---|
| EP | 0 679 871 | 11/1995 |
| FR | 2 811 424 | 1/2002 |
| FR | 2 871 564 | 12/2005 |
| WO | 02 052229 | 7/2002 |

* cited by examiner

*Primary Examiner* — Amy Cohen Johnson
*Assistant Examiner* — Tania Courson
(74) *Attorney, Agent, or Firm* — Oblon, Spivak, McClelland, Maier & Neustadt, L.L.P.

(57) ABSTRACT

A dashboard indicator module including a rotating actuator including a hollow output shaft controlling movement of an indicator with a light conducting path, connected to a light source, diffusing a light at an angle, and a reduction gear set. The external diameter of the conducting path is between 2.6 and 5.5 millimeters.

15 Claims, 6 Drawing Sheets

DASHBOARD INDICATOR MODULE

Figure 1:
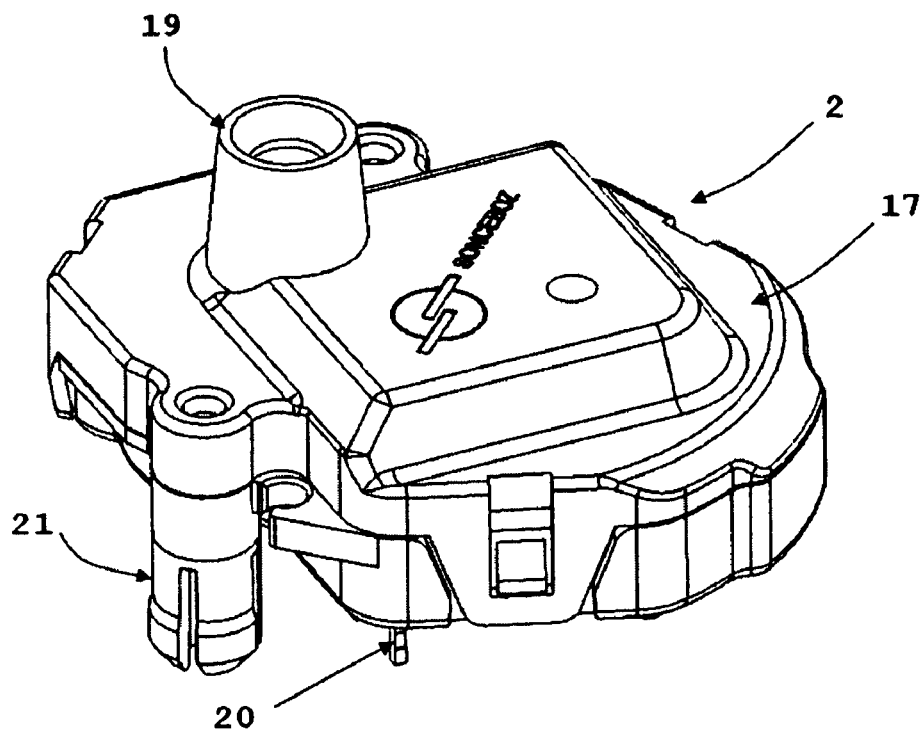

The present invention relates to field of analogic instruments for dashboards and more particularly dashboard indicator modules in motor vehicles. Such indicator modules are composed of an actuator or motor, often an electromagnetic one, driving into rotation an indicator, also called a needle or a pointer.

In a general way, such modules integrate a lighting function, very often through an electroluminescent diode which sends light into the path of the rotation shaft which may be either hollow or light conductor (transparent . . . ). Such modules are generally capable of allowing a sufficient lighting of the needle when the problem consists in illuminating the indicator under night utilisation conditions. The quality of the lighting can thus be estimated thanks to the luminance which is the light intensity of the light source in a given direction, divided by the surface area of such source in the same direction, expressed in Candela/m$^2$.

However, an increasing demand exists for a daytime lighting of motor vehicle dashboards. In this case, the luminance noted on the needle is not sufficient with the modules of the prior art. (Typically, the value of the luminance requested under daytime conditions is between 50 and 150 Cd/m$^2$, depending on the specifications).

The patent EP00679871 is known, which provides for a hollow shaft motor associated with an indicator which is positioned at the top of the hollow shaft. A light source is positioned in the form of an electroluminescent diode inside the hollow shaft and a guiding bearing. In such a configuration, a major part of the light emitted by the diode is reflected on the walls of the hollow shaft, and is absorbed, and is therefore useless for the lighting of the indicator. The result is an important loss of luminance at the level of the pointer. Under daytime conditions, the luminosity obtained is poor.

The application PCT WO00138120 is also known, which provides a transparent shaft motor. Such transparent shaft and the main wheel actuated by the motor are only one and the same part embodied in a transparent or a light conducting material. An electroluminescent diode is positioned, which sends the light into the shaft, facing the light conducting path. In this motor, since the main wheel and the shaft are the same part, an important loss of light exists in the wheel and under daytime conditions, and the obtained lighting is poor at the level of the indicator.

In addition, an increasing demand exists for special needle shapes which enable the movement of the indicator needle on the periphery of the dial instead of the conventional L shapes for a movement at the centre of the dial.

In this case again, given the high number of optical reflection surfaces and the modification in the physical medium which may induce an important loss of luminance, the various parts requested for the making of such needles are an obstacle to the correct illumination of the indicator.

Thus, the modules of the prior art do not make possible to transmit a sufficient lighting level for a correct visibility of the indicator when used in daytime.

The aim of the invention is thus to remedy such drawback by proposing an optimised module in order to enable a correct visibility of the end of the indicator, in ambient light, without requesting any change in the dimensions thereof.

For this purpose, the invention relates to a dashboard indicator module comprising a rotating actuator with a hollow output shaft controlling the movement of an indicator with a light conducting path connected to a light source, diffusing a light at an angle α and a reduction gear set characterised in that the external diameter D of the conducting path is between 2.6 and 5.5 millimeters and in that the light source is positioned under said hollow shaft.

The selection of a diameter of the conducting path in this range of values which is unusual for this type of indicators, brings a solution to the loss of luminous energy in the needle, while guaranteeing appropriate mechanical qualities.

Preferably, the distance between the light source and the shaft base, indicated by H, is defined as being equal to $$\frac{D}{2 \cdot \tan\left(\frac{\alpha}{2}\right)},$$

maximum so as to guarantee an optimal lighting of the shaft.

With a view to obtaining a sufficient lighting under daytime conditions, an evident solution consists in increasing the diameter of the shaft. However, the dashboard indicator modules of the prior art do not make possible to have a light conducting path having an external diameter above 2.5 millimeters. As a matter of fact, an increase in the diameter of the shaft in the modules of the prior art entails proportional losses of light (more light reflected on the walls of the hollow shaft and/or in the output wheel actuated by the motor). Finally, the loss of light is too important. It cannot be considered to significantly increase the diameter of the shaft to be able to obtain a sufficient luminance at the needle, and this entails the modification of the distance between the axes of the output shaft and the driving wheel. Then, the dimensions of the motor as a whole must be modified in order to be able to position the same reduction gear set, which is not desirable with the aim of an economical industrialisation.

Similarly, it is possible to use a more powerful diode to obtain a better luminosity, but the extra costs of such diode is often impossible to consider for such a motor vehicle application. In addition, such more powerful diodes require a more important power supply, which implies that an important Joule power must be dissipated, which is not desirable for the application in a motor vehicle.

Thus, one of the aims of the invention is to provide an indicator module having standard dimensions and a bearing having a limited radial thickness, characterised in that the ratio of the internal diameter of the hollow shaft to the internal diameter of the bearing receiving such hollow shaft is above 0.9.

In a preferable embodiment, the light source is composed of a not encapsulated electroluminescent diode positioned behind the light conducting path of the indicator and directly welded on the printed circuit controlling the actuator.

In another embodiment, the light source is composed of an electroluminescent diode having an ogival shape disposed in the hollow shaft, behind the conducting path of the indicator.

In a preferable embodiment, the indicator is composed of a single part moulded in a single material, having a first part forming a shaft for the coupling with the hollow shaft of the actuator, a second part extending substantially perpendicularly, being extended or not by a curved part defining a space for the passage of the dial edge.

Thus, on the one hand, there is no modification in the physical medium during the travel of the light in the indicator, which induces no loss of light, and on the other hand the curved part makes it possible to avoid the reflection surface and thus makes it possible to limit the losses of light.

Another object of the invention consists in being able to propose a module which, while allowing an optimised transmission of light from the light source to the indicator, has a simplified and economical indicator structure.

For this purpose, in a secondary embodiment, the present invention provides for an indicator having no cover and is characterised in that the single part used as an indicator has, at the level of changes in the orientation of two consecutive parts, a reflection sloping area.

Another object of the invention is to provide for an indicating path having a shoulder on the vertical part thereof, which is intended to come into contact with the inside of the hollow shaft. Therefore, the optimal distance between the LED and the lower end of the indicator is guaranteed, which guaranties an optimal luminosity.

Figure 2:
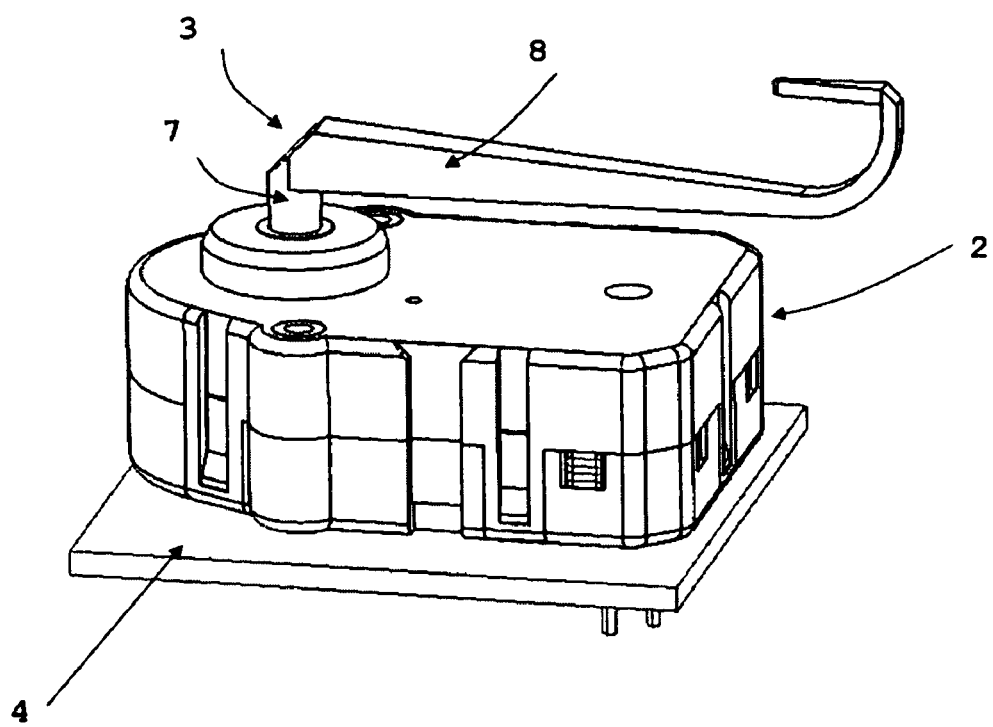
Figure 3:
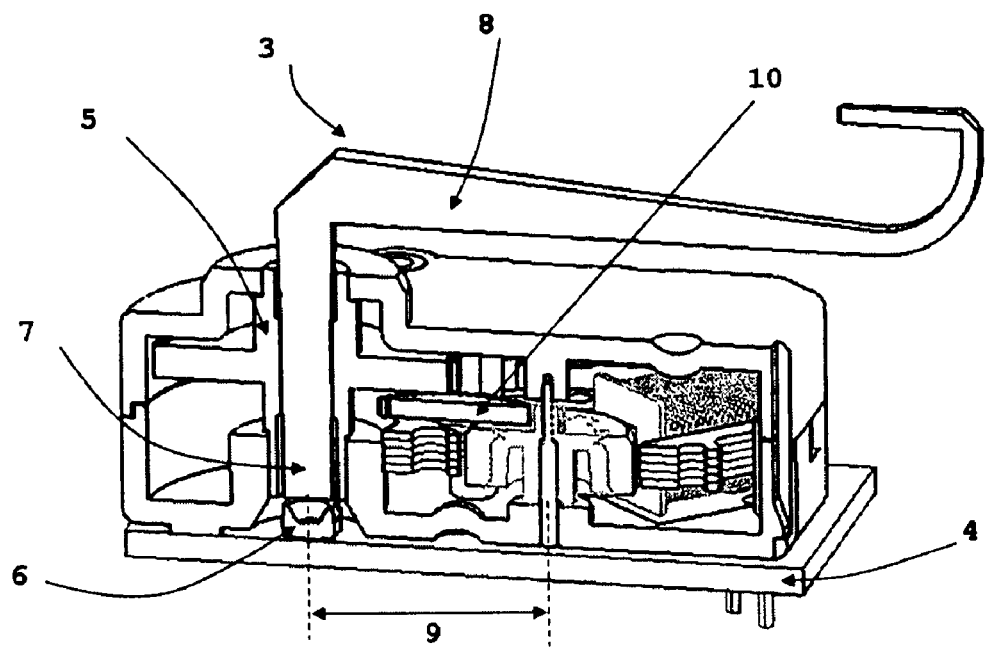
Figure 4:
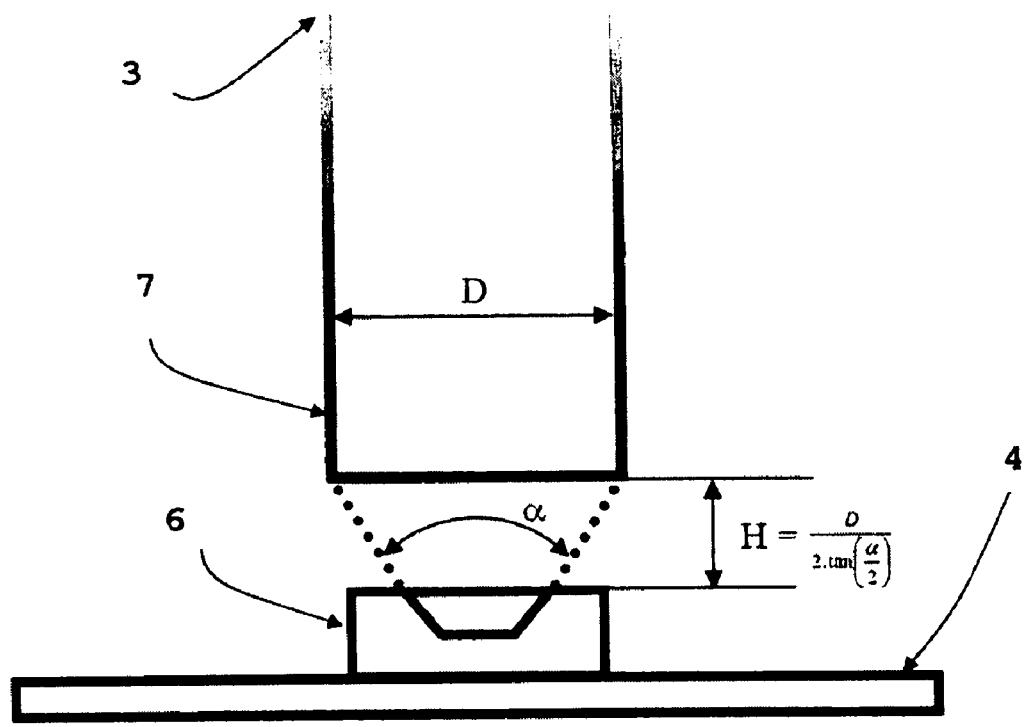
Figure 5:
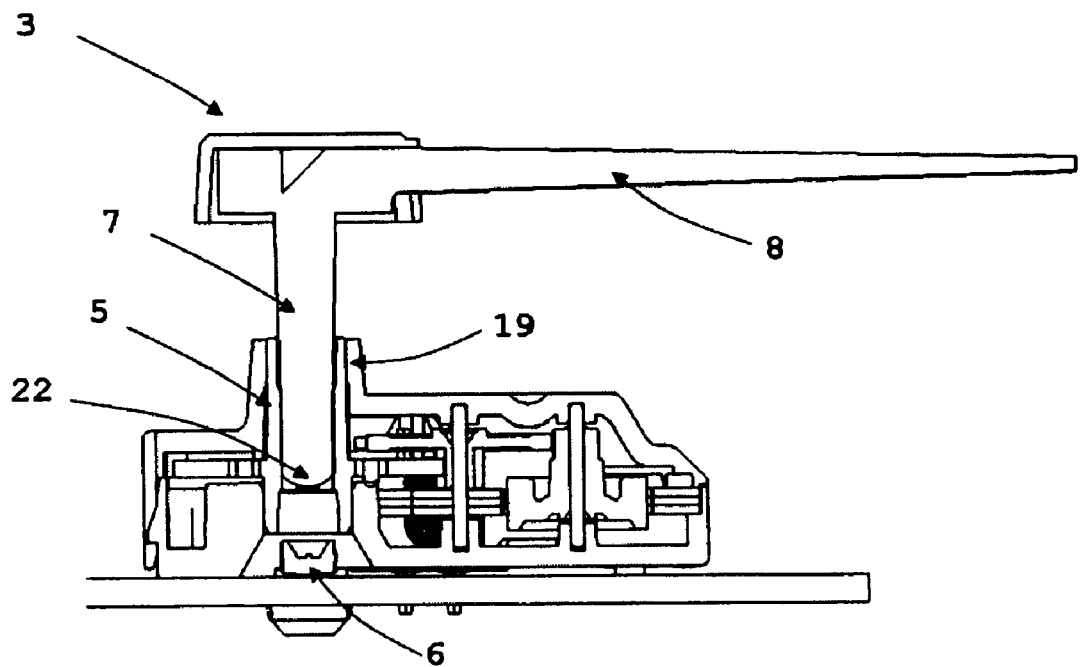
Figure 6:
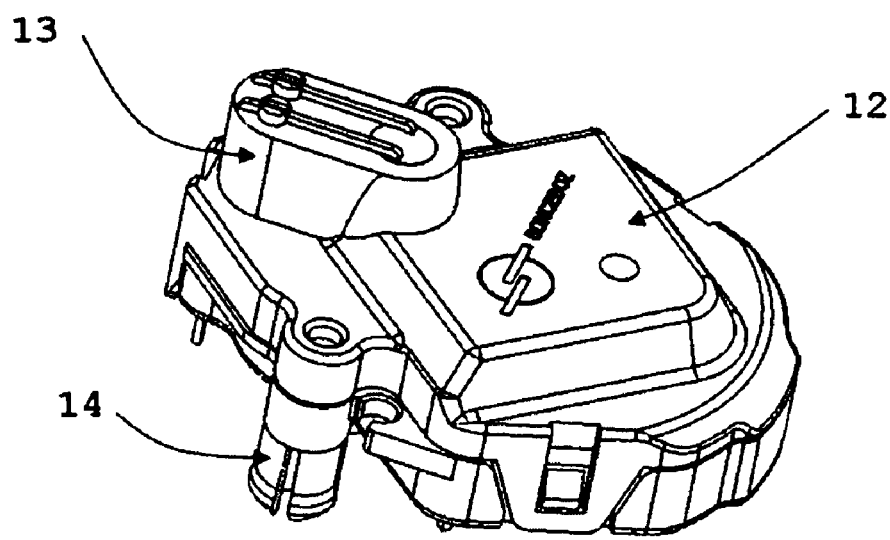
Figure 7:
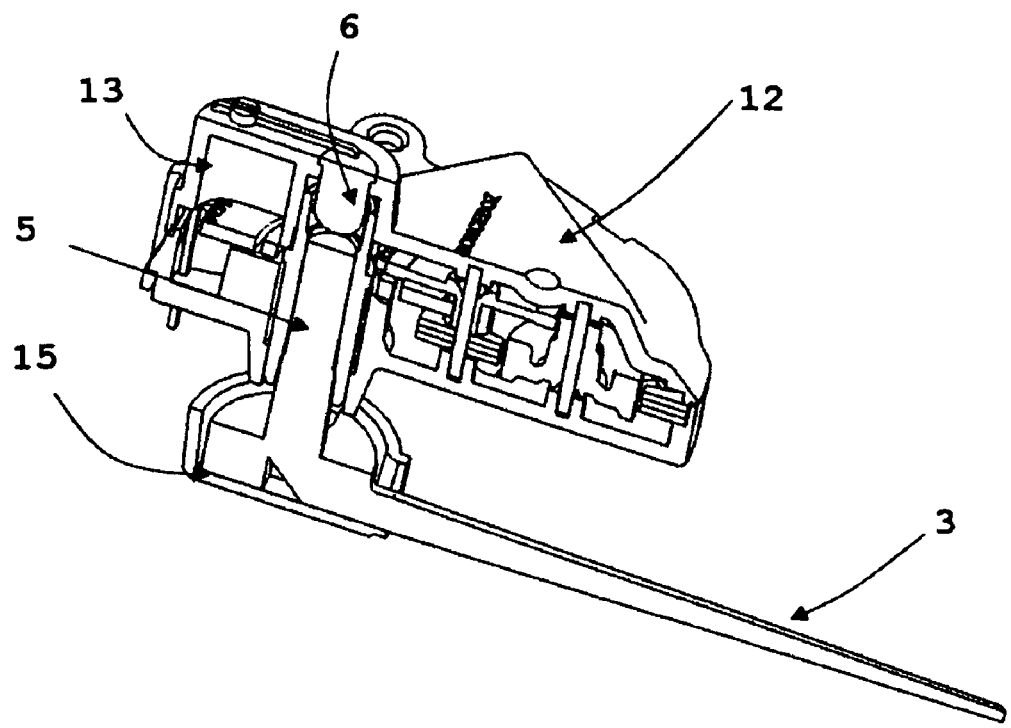
Figure 8:
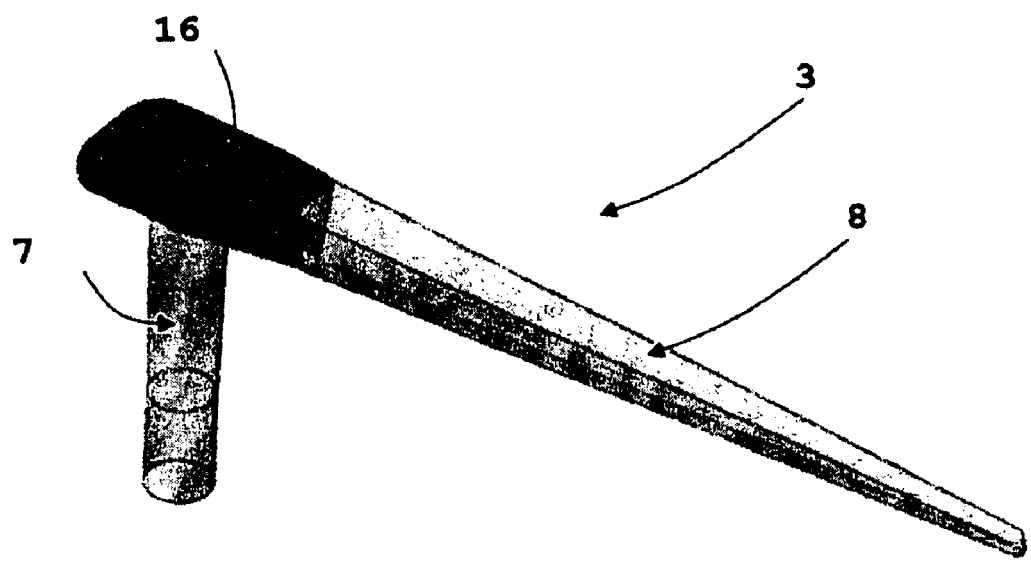
Figure 9:
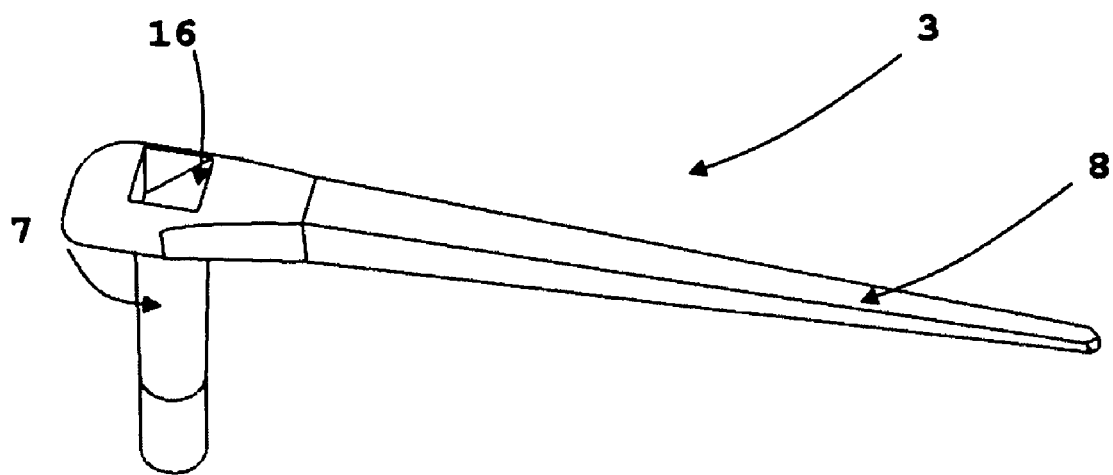
Figure 10:
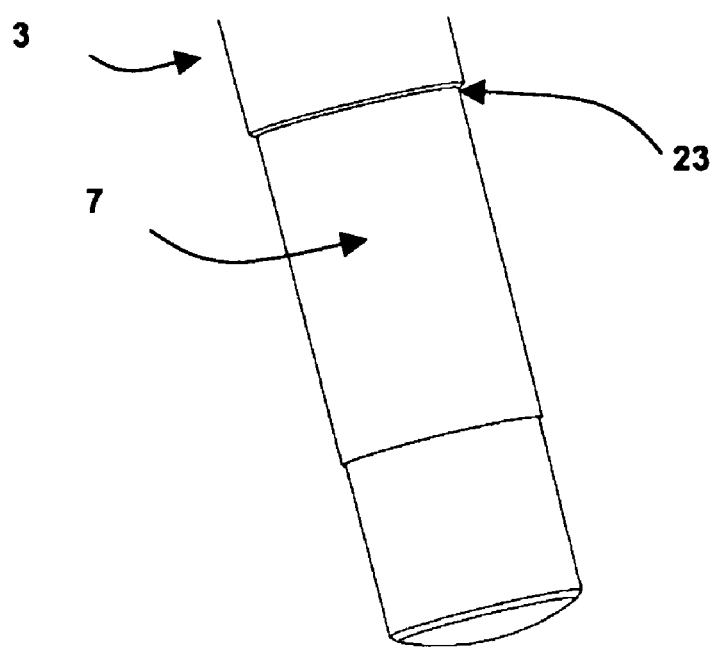
Figure 11:
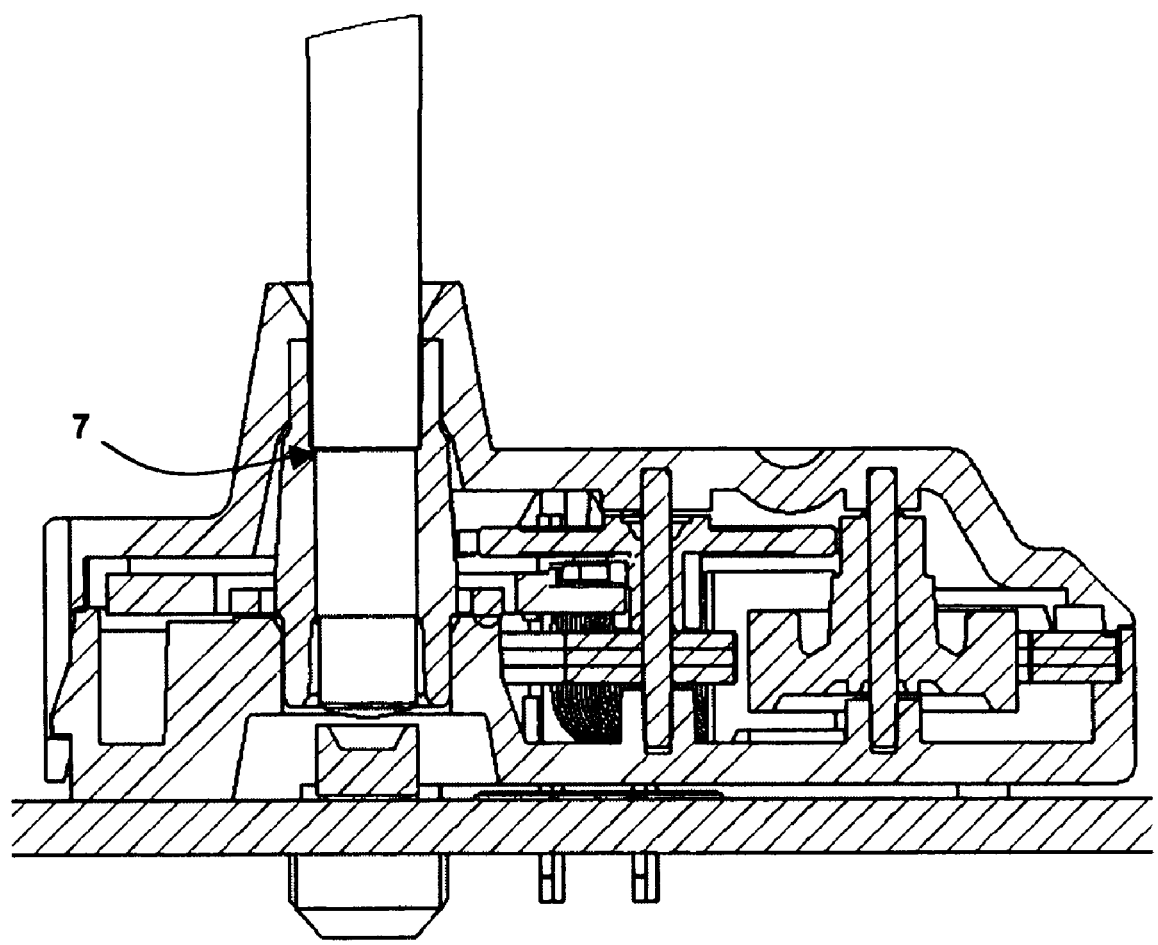

The invention will be better understood upon reading the following description which refers to the appended drawings, where:

FIG. 1 shows a motor used in the dashboard indicator module described by the present invention, FIG. 2 shows an indicator module according to the invention, in a first embodiment thereof, FIG. 3 shows a cross-sectional view of the indicator module of the preceding Figure, FIG. 4 shows a cross-sectional view of the module described by the present invention, FIG. 5 shows a cross-sectional view of the indicator module according to the invention in a second embodiment, with the motor of FIG. 1, FIG. 6 shows an indicator module having no needle, according to a third embodiment, FIG. 7 shows a cross-sectional view of the indicator module shown in the previous Figure with a needle, FIG. 8 shows a separate view of a needle according to the invention, in a first embodiment, FIG. 9 shows a separate view of a needle according to the invention, in a second embodiment thereof, FIG. 10 shows a separate view of the lower part of a needle having a shoulder, according to an advantageous embodiment of the present invention, FIG. 11 shows a cross-sectional view of an indicator module according to the advantageous embodiment of the present invention.

FIG. 1 shows an actuator 2, in a first embodiment typically used in the present indicator module. It is composed of a body 17 generally made of plastic currently containing an electromagnetic motor 18, a reducing gear set 10 and a wheel or a hollow output shaft 5 which is movable in rotation when actuated by said electromagnetic motor 18. The actuator 2 also includes a protrusion 19 used as a bearing to guide a needle 3 which is not visible here, which has just been connected to the hollow shaft 5 thanks to their matching shapes. Such actuator 2 is intended to be positioned and connected to a printed circuit 4 through electric connection lugs 20 and mechanical holding and guiding elements 21.

FIG. 2 shows an indicator module 1 for a dashboard composed of an electric actuator 2 and a needle or an indicator 3. Such module 1 is generally welded on a printed circuit 4 which supports it and the assembly is intended to be positioned in a dashboard of a motor vehicle to indicate various conditions of the motor vehicle (fuel indicator, speedometer, tachometer . . . ). The actuator 2 has a standard shape and standard dimensions for such an application. The module 1 has a needle 3 made of a C-shaped light conducting material, having a first part 7 forming a shaft for the coupling with the actuator hollow shaft and a second part 8 extending substantially perpendicularly and extended by a curved part defining a space for the passage of the dial edge. Such needle forms one single part which makes it possible to limit the losses of light as regards the modifications in the orientation of the various parts of the needle 3.

FIG. 3 shows in greater details the inside of the module 1 as appearing in the preceding figure. The needle 3 has a first part 7 coupled with the actuator 2 of the hollow shaft 5. The diameter D of such part 7 of the cylindrical type is between 2.6 and 5.5 mm and thus makes possible to collect in an optimum way the light generated by the electroluminescent diode 6 positioned at a distance H from the lower end of the first part 7 of the needle 3 having a maximum value of $$\frac{D}{2 \cdot \tan\left(\frac{\alpha}{2}\right)}.$$

Such value is explained in FIG. 4. Such compound of the CMS type, which is not encapsulated, is welded on the printed circuit 4, and is directly positioned under the hollow shaft 5. Positioning a non CMS encapsulated diode 6 having an ogival shape on the printed circuit 4 can be considered. The first part 7 of the needle 3 thus has a light collecting surface which has a section between 2.6 and 5.5 mm for an optimal collection of the light produced by the diode 6. The actuator 2 has a distance between the axes 9 which has a conventional value for such a type of actuator 3, as known in the present state of the art. The ratio of the internal diameter of the hollow shaft 5 to the internal diameter of the bearing receiving the shaft 5 is greater than 0.9, which makes it possible to guarantee that the greater diameter of the axis 3 is not an obstacle for positioning an equivalent gear set in the assigned and unchanging distance between the axes 9. In an advantageous but non limitative way, the internal diameter of the hollow shaft 5 may be coated with paint or a deposit having a strong reflecting power so as to limit the possible dissipation of light by the rays hitting the inside of the hollow shaft 5.

FIG. 4 shows a schematic cross-sectional view of an indicator module 1 described by the present invention, and more particularly a separate view of the light source 6, placed on a printed circuit 4, and of the first part 7 of the needle 3. The light source emits a radiation at an angle α and the lower part of the needle 3 has a given diameter D. Then, the optimum light emitted by the source 6 in the part 7 is, for a distance H from the part 7 to the source 6, at most equal to $$\frac{D}{2 \cdot \tan\left(\frac{\alpha}{2}\right)}.$$

FIG. 5 shows a cross-section of the module 1 made with an actuator 2 according to the embodiment of FIG. 1.

A single block needle, the first part 7 of which is positioned in the hollow shaft 5 through the protrusion 19 positioned on the upper part of the actuator 2 can be seen. The first part 7 is a part of the cylindrical type with a diameter between 2.6 and 5.5 mm, and the end thereof has advantageously, but not limitatively, a domed or a meniscus shape 22. Such particular shape makes it possible for the light radiations emitted by the LED 6 to remain focused and parallel to the axis of the first part 7 and thus limits the number of light radiations hitting the inside of the hollow shaft 5 which takes no part in the lighting of the shaft.

FIG. 6 shows the external appearance of the actuator 2 in a third embodiment, wherein the hood 12 includes an encapsulated ogival-shaped diode, directly welded inside the hood 12 in a recess 13 provided for this purpose.

The actuator 2 has fixing lugs 14 provided to be capable of being fixed on the printed circuit 4 for a mechanical holding of the actuator 2. In this embodiment, the actuator 2 is mounted from behind, i.e. the needle 3 comes out on the lower face of the actuator 2.

FIG. 7 shows in greater details the inside of the actuator 2 in this embodiment. The electroluminescent diode 6 is an encapsulated diode directly positioned under the hollow shaft 5 for an optimum lighting of the needle 3. In such an embodiment, the connected needle 3, conventionally has a cap 15 made of plastic material.

FIGS. 8 and 9 show a needle 3 having a single part made of a light conducting material, composed of a first part 7 intended to be connected in the hollow shaft 5 of the actuator 2, a second part 8 extending perpendicularly to the first part 7. In FIG. 8, this needle 3 made of a single part has no cover but a black coating is positioned at the joint of both parts 7 and 8 so as not to generate a visual obstacle for the user and to minimise the light losses by refraction.

In order to optimise the passage of light between both parts 7 and 8 without creating an important loss of luminosity, a reflection surface 16 may be provided by depositing some material having important reflecting properties (of the paint or coating type, . . . ) or by etching a surface 16, as shown in FIG. 9.

According to an advantageous embodiment of the present invention shown in FIGS. 10 and 11, a shoulder 23 is arranged on the vertical axis. FIG. 10 shows a separate view of the lower part of the needle 3 having such shoulder 23 on the vertical part 7 thereof. Such shoulder is adapted to a precise positioning of the needle 3 upon the mounting thereof on the motor in the hollow shaft 5. As can be seen in FIG. 11, the shoulder abuts inside the hollow shaft, the latter having a chamfer intended to receive the shoulder. Thus, the distance between the LED and the lower end of the first part 7 of the needle 3 is guaranteed, which makes it possible to enjoy an optimum luminance.

The invention claimed is:

1. A dashboard indicator module comprising:
    a rotating actuator including a hollow output shaft controlling movement of an indicator with a light conducting path connected to a light source diffusing a light at an angle α and a reduction gear set,
    wherein the conducting path has an external diameter between 2.6 and 5.5 millimeters, and
    wherein the light source is positioned under the hollow shaft,
    wherein the conducting path has a base opposite to the light source positioned at a predetermined distance H from the light source, wherein the predetermined distance H is equal to or less than
    $$\frac{D}{2 \cdot \tan\left(\frac{\alpha}{2}\right)}.$$

2. A dashboard indicator module according to claim 1, wherein the hollow shaft includes an upper part and the light conducting path includes a shoulder contacting the upper part of the hollow shaft to fix the predetermined distance H.

3. A dashboard indicator module according to claim 1, wherein the indicator includes a single part molded in a single material, including a first part forming a shaft for coupling with the hollow shaft of the actuator and a second part extending substantially perpendicularly.

4. A dashboard indicator module according to claim 1, wherein the conducting path presents a base opposite to the light, the base of the conducting path including a domed surface with a shape of a meniscus.

5. A dashboard indicator module according to the claim 1, wherein a ratio of internal diameter of the hollow shaft to internal diameter of the bearing receiving the hollow shaft is greater than 0.9.

6. A dashboard indicator module according to claim 1, wherein the hollow shaft includes an internal surface presenting a strong reflecting power.

7. A dashboard indicator module according to claim 1, wherein the light source includes an electroluminescent diode positioned behind the indicator conducting path.

8. A dashboard indicator module according to claim 7, wherein the electroluminescent diode is a not encapsulated diode directly welded on a printed circuit controlling the actuator through a method of CMS type.

9. A dashboard indicator module according to claim 8, further comprising a light reflection sloping zone having at a level of changes in orientation of two consecutive parts.

10. A dashboard indicator module according to claim 9, wherein the light reflection sloping zone is obtained by etching the surface.

11. A dashboard indicator module according to claim 10, wherein the light reflection sloping zone is obtained by deposition of some material.

12. A dashboard indicator module according to claim 1, wherein the light source includes an electroluminescent diode of an ogival shape positioned in the hollow shaft, behind the indicator conducting shaft.

13. A dashboard indicator module according to claim 12, wherein the electroluminescent diode is an encapsulated diode positioned in a motor hood.

14. A dashboard indicator module according to claim 13, wherein a second part is extended by a curved part defining a space for the passage of the dial edge.

15. A dashboard indicator module comprising:
    a rotating actuator comprising a motor having a hollow output shaft;
    an indicator with a light conducting path having an external diameter between 2.6 and 5.5 mm; and
    a light source diffusing a light at an angle α and positioned under the hollow shaft,
    wherein the conducting path has a base opposite to the light source and positioned at a predetermined distance H from the light source, wherein the predetermined distance H is lower than or equal to
    $$\frac{D}{2 \cdot \tan\left(\frac{\alpha}{2}\right)},$$
    and
    wherein the hollow shaft includes an upper part and the light conducting path includes a shoulder contacting the upper part of the hollow shaft to fix the predetermined distance H.

* * * * *